United States Patent [19]

Podkowa

[11] Patent Number: 5,315,959
[45] Date of Patent: May 31, 1994

[54] DEBRIS TRAPPING COMB

[76] Inventor: Gloria J. Podkowa, 4941 N. Normandy, Chicago, Ill. 60656

[21] Appl. No.: 116,869

[22] Filed: Sep. 3, 1993

[51] Int. Cl.⁵ .......................................... A45D 24/00
[52] U.S. Cl. .................................... 119/87; 132/151
[58] Field of Search .................... 119/83, 87, 85, 86, 119/88, 89, 93-94; 132/151, 152, 153, 154, 155, 121

[56] References Cited

U.S. PATENT DOCUMENTS

| | | |
|---|---|---|
| 91,984 | 6/1869 | Stackhouse . |
| 1,057,109 | 3/1913 | Alexandrescu . |
| 1,255,601 | 2/1918 | Hare . |
| 1,290,554 | 1/1919 | Healey ............... 119/88 |
| 1,621,425 | 1/1926 | Meek . |
| 1,708,419 | 2/1928 | Jurich . |
| 2,470,157 | 5/1946 | Gambino ............ 132/11 |
| 2,738,767 | 3/1956 | Rosenquist ......... 119/85 |
| 2,781,739 | 2/1957 | Dick et al. ......... 119/88 |
| 4,936,259 | 6/1990 | Owen et al. ........ 119/83 |

Primary Examiner—Thomas Price
Attorney, Agent, or Firm—Trexler, Bushnell, Giangiorgi & Blackstone, Ltd.

[57] ABSTRACT

A debris-trapping comb comprises a handle having an elongated tooth-receiving portion and a gripping portion coupled with the tooth-receiving portion. A plurality of closely spaced teeth are mounted along the length of the elongated tooth-receiving portion and project outwardly thereof. An elongated debris-trapping shield member is coupled to the handle and has a trapping portion and a mounting portion for mounting the shield member to the handle. The trapping portion projects to one side of the teeth and along the length of the tooth-receiving portion and defines a trap area between the teeth and the trapping portion for trapping debris caught by the teeth during combing. A hinge extends longitudinally across the shield member for hingedly joining the trapping portion to the mounting portion and positioned for permitting the trapping portion to be hingedly retracted away from the teeth to thereby open the trap area to permit removal of debris therefrom.

7 Claims, 2 Drawing Sheets

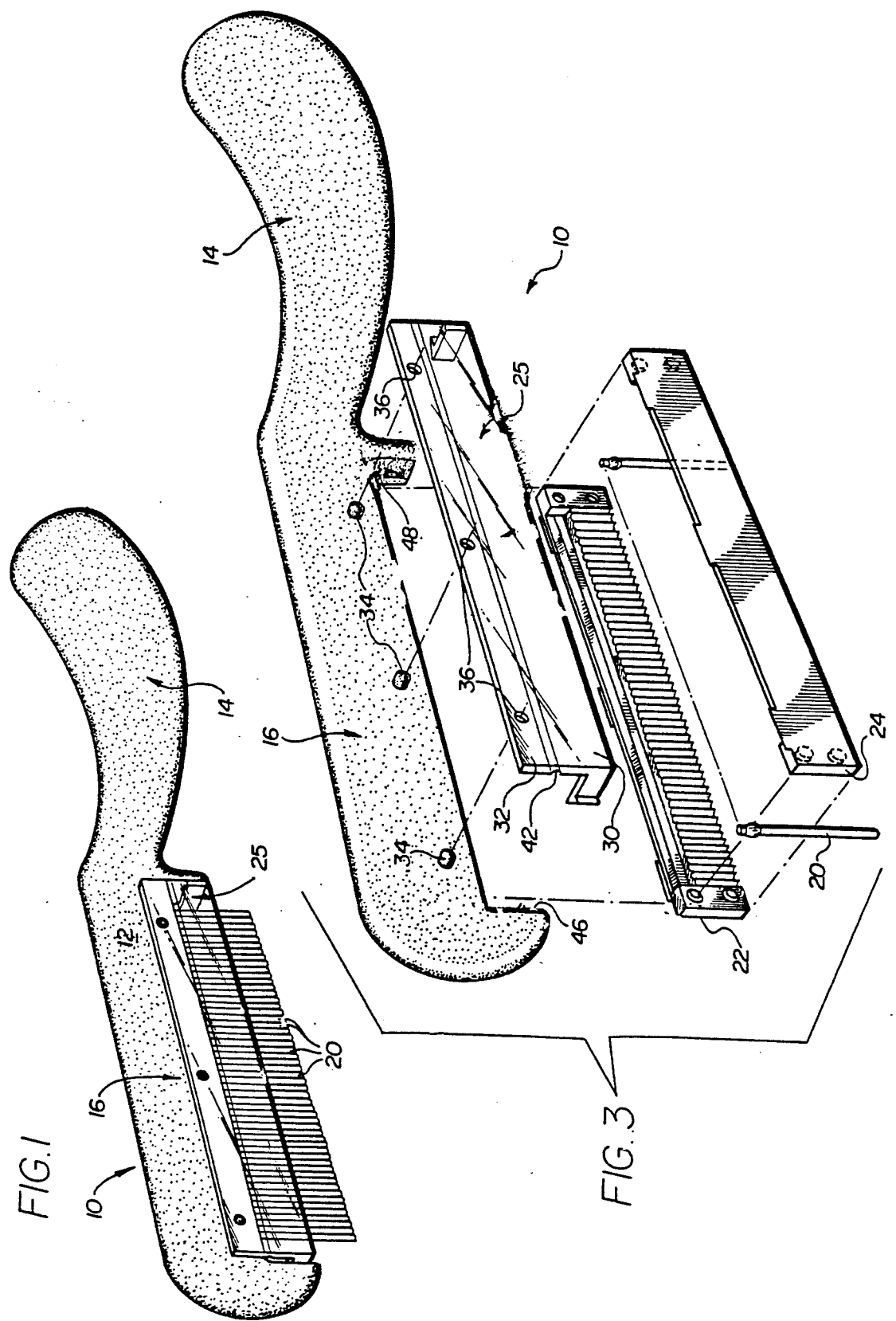

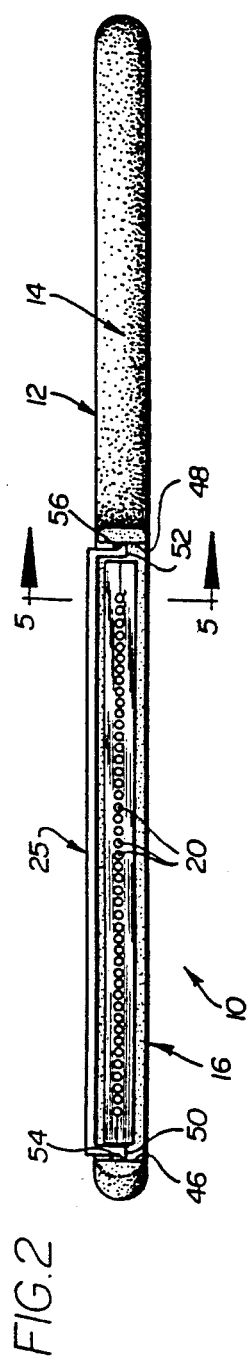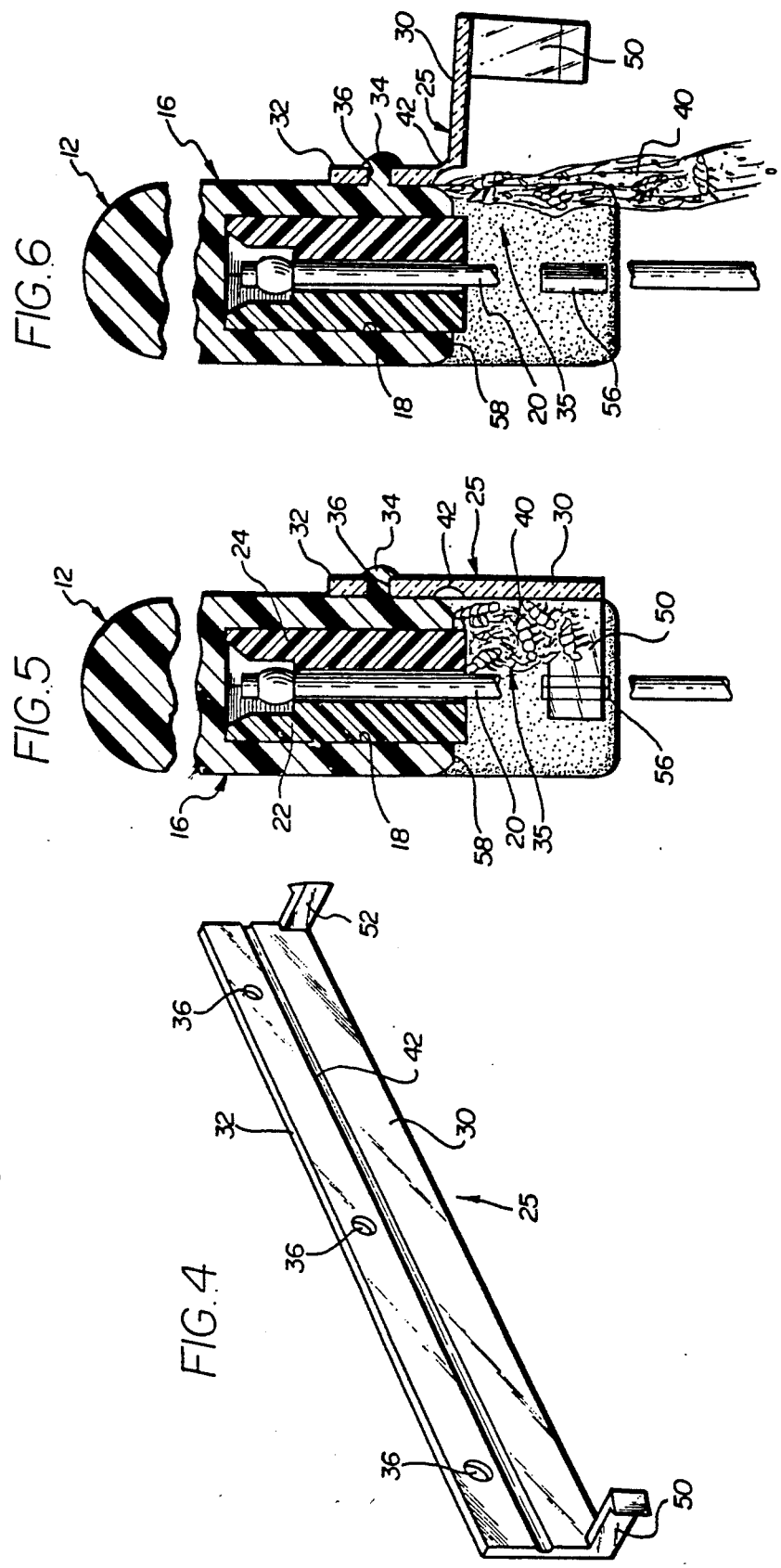

DEBRIS TRAPPING COMB

BACKGROUND OF THE INVENTION

This invention is directed to the comb arts, and more specifically to a novel and improved comb having a debris trapping structure which may be used, for example, for grooming pets.

Preferably, the debris trapping comb of the invention is embodied in a comb structure with rotatable teeth of the type generally described in prior Owen et al. U.S. Pat. No. 4,936,259. However, the features of the invention may be embodied in combs of different types without departing from the invention.

A variety of combs having various debris trapping features are disclosed in various U.S. Patents. For example, Alexandrescu, U.S. Pat. No. 1,057,109 shows a comb having a retainer member attached to the comb, which is so shaped that the space enclosed is enlarged toward the middle of the comb. A front end portion of the retainer is covered with a material such as felt, cloth or the like, and preferably the entire retainer is constructed of such a material. The retainers are carried by a frame which slides over the comb. As such, the retainer must be removed from the comb to permit removal of debris which is accumulated in the retainer.

In Hare U.S. Pat. No. 1,255,601, a housing which is similar in shape to the retainer member of Alexandrescu is provided and the comb is positioned in the housing. Alternatively, the comb teeth may be formed in a projecting outer end of one wall of the housing. The space defined by the housing is preferably filled with cotton or other fibrous material No provision is made for disassembling the comb from the housing, such that the cotton or other fibrous material must be removed and the entire device immersed in hot water to remove accumulated debris therefrom. A hinged leaf permits some adjustment of the spacing between the teeth of the comb and the housing to allow ingress of debris in to the housing, but this opening is not sufficiently adjustable to permit emptying of debris from the housing.

Meek U.S Pat. No. 1,621,425 and Gambino U.S. Pat. No. 2,470,157 illustrate similar combs in which a channel-shaped member is slidably affixed over a handle portion of the comb to facilitate removal of debris from the comb. As such, this channel section must be removed entirely from the comb to permit the removal of accumulated debris therefrom. In the Gambino structure the channel-shaped member cooperates with a receptacle formed integrally with the teeth of the comb to define a debris-receiving area.

In Jurich, U.S. Pat. No. 1,708,419 a channel-shaped member similar to the channels in the above Gambino and Meek patents is pivotally attached at one end of the comb and contacts and overlies a portion of the teeth to form a debris-catching area between teeth in the area in which the teeth are joined to the handle. The channel member is pivotally mounted at one end of the comb handle to pivot away from the comb to permit removal of debris accumulated between the teeth of the comb.

Finally, in Stackhouse U.S Pat. No. 91,984, a trough-shaped attachment is shown which is pivotally suspended beneath the teeth of the comb and pivots out of the way during combing, such that the trough catches debris which falls from the teeth of the comb immediately following the combing. However, this trough does not catch or accumulate debris while the comb is being drawn through the hair.

A common problem among the above-described combs of the prior patents is that the various structures disclosed are not well suited to simple and inexpensive mass production techniques. These combs generally require individual production and hand assembly of a number of parts.

OBJECTS AND SUMMARY OF THE INVENTION

Accordingly, it is an object of the invention to provide a novel and improved debris trapping comb.

A related object is to provide a debris trapping comb which can be easily and efficiently assembled using mass production techniques.

A further object is to provide a debris trapping comb which includes a trap area for trapping debris caught by the teeth during combing, which trap area can be easily accessed for removal of debris following combing.

Briefly, and in accordance with the foregoing objects, the present invention provides a debris trapping comb comprising a handle having an elongated tooth-receiving portion and a gripping portion coupled with said tooth-receiving portion; a plurality of closely spaced teeth mounted along the length of said elongated tooth-receiving portion and projecting outwardly thereof; and an elongated debris-trapping shield member coupled to said handle and having a trapping portion and a mounting portion for mounting said shield member to said handle; said trapping portion projecting from said mounting portion to one side of said teeth and along the length of said tooth-receiving portion and defining a trap area between said teeth and said trapping portion for trapping debris caught by said teeth during combing, and hinge means extending longitudinally across said shield member for hingedly joining said trapping portion to said mounting portion and positioned for permitting said trapping portion to be hingedly retracted away from said teeth to thereby open said trap area to permit removal of debris therefrom.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a perspective view of a comb in accordance with the invention;

FIG. 2 is a bottom plan view of the comb of FIG. 1;

FIG. 3 is an exploded perspective view illustrating the various parts and assembly thereof to form the comb of FIGS. 1 and 2;

FIG. 4 is an enlarged perspective view of a debris trapping shield portion of the invention;

FIG. 5 is an enlarged sectional view taken generally along the line 5—5 of FIG. 2 and partially broken away; and FIG. 6 is a sectional view similar to FIG. 5 and illustrating removal of accumulated debris from a trap area of the comb.

DETAILED DESCRIPTION OF THE ILLUSTRATED EMBODIMENT

Referring to the drawings, and initially to FIGS. 1-3, a debris trapping comb in accordance with a preferred embodiment of the invention is designated generally by the reference numeral 10. Preferably, the comb 10 is substantially similar to the comb structure shown in prior U.S. Pat. No. 4,936,259. In this regard, the comb 10 has an elongate handle portion 12 having a grip or gripping portion 14 which extends from an elongated tooth-receiving portion 16. A plurality of teeth 20 are mounted to and extend outwardly from the tooth-receiving portion 16. Preferably, the teeth 20 are rotatably mounted in a row by means of an additional mounting member or holder which is comprised of two identical halves 22, 24. This holder 22, 24 interfits with a complementary recess 18 in the tooth-receiving portion 16 of the handle 12. The details of the teeth 20 and their mounting to the handle 12 are more fully described in the above-referenced U.S. Pat. No. 4,936,259 which is incorporated by reference in this regard.

It should be noted that the invention may be utilized with combs of other configurations than that described hereinabove without departing from the invention.

Referring now also to the remaining figures of drawings, in accordance with the invention a novel, elongated debris-trapping shield member 25 is mounted to the handle 12. The shield 25 includes a trapping portion 30 and a mounting portion 32. The mounting portion 32 is mounted along the length of the elongated tooth receiving portion 16. In the illustrated embodiment, a plurality of spaced apart projections or bosses 34 are formed on a side surface of the handle 12 along tooth-receiving portion 16 for this purpose. Cooperatively, the shield 25 and specifically the mounting portion 32 thereof has a plurality of apertures 36 which are located and configured for interfitting with the bosses 34 to accomplish proper positioning and mounting of the shield 25 relative to the handle 12. Preferably, the bosses 34 may be deformed to retain the shield 25 upon interfitting of the apertures 36 thereover.

The trapping portion 30 projects from the mounting portion 32 so as to overlie the teeth 20 along one side thereof. The trapping portion 30 extends along the entire length of the tooth-receiving portion 16 and thus overlies all of the teeth 20 which project therefrom. The mounting of the shield 25 to the side surface of handle 12 by means of the bosses 34 and apertures 36 also results in the trapping portion 30 of the shield 25 being parallel to and spaced apart from the teeth 20 when in a "working" position, as best viewed in FIG. 5. This arrangement defines a trap area 35 between the teeth 20 and the trapping portion 32. The trap area 35 serves to trap debris 40 between the teeth 20 and the trapping portion 30 during combing.

In accordance with an important feature of the invention, a hinge or hinge means 42 extends longitudinally across the shield member 25 and hingedly joins the trapping portion 30 to the mounting portion 32. The hinge member is positioned for permitting the trapping portion to be hingedly retracted away from the teeth 20, as best viewed in FIG. 6, so as to open the trap area 35 and permit the removal of debris 40 therefrom.

In the illustrated embodiment, the handle 12 also has a pair of projecting end walls 46,48 generally located at or defining opposite longitudinal ends of the tooth-receiving portion 16, and generally spaced somewhat to either longitudinal end of the row of teeth 20. These end walls 46,48 project from the handle 12 in the same direction as the teeth 20, but preferably to a lesser extent. Cooperatively, the trapping portion of the shield 25 includes latching means in the form of a pair of barbed projecting members 50,52. These barbed projecting members 50,52 are releasably engagable with the end walls 46,48 for releasably holding the trapping portion 30 in the working position, substantially parallel to and spaced apart from the teeth 20 to define the trap area 35 therebetween. Cooperatively, the end walls 46,48 preferably include raised detent portions or ridges 54,56 for snapping engagement with the barbed projecting members 50 and 52.

It is noted that the mounting bosses 34 and cooperating apertures 36 are respectively located relative to the hinge portion 42 such that the hinge 42 is substantially in alignment with the plane or surface 58 from which the teeth 20 project from the handle 12. Preferably, the shield member 25 is formed of a moldable plastic material and further is preferably a transparent member. Preferably, the hinge 42 comprises a living hinge which is formed longitudinally across the shield member 25.

In use, as best viewed in FIGS. 5 and 6, the shield 25 is retained in its working position by action of the barbed projections 50 and 52 and cooperating detent members or ridges 54, 56. In this position the shield generally defines the trap area 35 for trapping debris 40 while the comb is in use, for example, combing a pet. When it is desired to remove debris from the trap area 35, the trapping portion 30 of the shield is hingedly moved away from the trap area 35 as illustrated in FIG. 6. In this regard, the hinge 42 may permit as much as 90° or more of movement of the trapping portion 30 of the shield 25 away from its working position illustrated in FIG. 5. This permits the debris 40 readily to be removed from trap area 35, as best viewed in FIG. 6.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. A debris-trapping comb comprising: a handle having an elongated tooth-receiving portion and a gripping portion coupled with said tooth-receiving portion; a plurality of closely spaced teeth mounted along the length of said elongated tooth-receiving portion and projecting outwardly thereof; and an elongated debris-trapping shield member coupled to said handle and having a trapping portion and a mounting portion for mounting said shield member to said handle; said trapping portion projecting from said mounting portion to one side of said teeth and along the length of said tooth-receiving portion and defining a trap area between said teeth and said trapping portion for trapping debris caught by said teeth during combing, and hinge means extending longitudinally across said shield member for hingedly joining said trapping portion to said mounting portion and positioned for permitting said trapping portion to be hingedly retracted away from said teeth to thereby open said trap area to permit removal of debris therefrom.

2. A comb according to claim 1 wherein said handle further comprises a pair of projecting end walls spaced to either longitudinal end of said plurality of teeth and projecting from said handle in the same direction as said teeth, and wherein said trapping portion includes latching means releasably engagable with said end walls for releasably holding said trapping portion in a working position wherein said trapping portion is substantially parallel to and spaced apart from said teeth to define said trap area therebetween.

3. A comb according to claim 2 wherein said latching means comprise a pair of barbed projecting members which extend from opposite longitudinal ends of said trapping portion for releasable engagement with said end walls.

4. A comb according to claim 3 wherein each of said end walls includes a raised detent portion for snapping engagement with one of said of barbed projecting members.

5. A comb according to claim 1 wherein said shield member is formed of a moldable plastics material and wherein said hinge means comprises a living hinge formed longitudinally across said shield member.

6. A comb according to claim 1 and further including mounting means for non-removably attaching said mounting portion to said handle and for aligning said hinge means substantially with a plane from which said teeth project from said handle.

7. A comb according to claim 6 wherein said mounting means includes a plurality of bosses projecting from said handle and a plurality of apertures in said mounting portion of said shield member located and configured for receiving said bosses therethrough.

* * * * *